United States Patent [19]

Hindin et al.

[11] 4,316,418

[45] Feb. 23, 1982

[54] CONVERTIBLE RAIL HIGHWAY SEMI-TRAILER AIR CONTROLLED SUSPENSION SHIFTING SYSTEM

[75] Inventors: Eugene Hindin, Bala Cynwyd, Pa.; Alan R. Cripe, Richmond, Va.; Christopher A. Cripe, Coatesville, Pa.

[73] Assignee: Bi-Modal Corporation, Greenwich, Conn.

[21] Appl. No.: 145,748

[22] Filed: May 1, 1980

[51] Int. Cl.³ .................... B60F 1/04; B61D 3/10; B61H 1/00; B62D 61/12
[52] U.S. Cl. ................ 105/215 C; 105/165; 188/56; 280/80 B
[58] Field of Search ............. 105/165, 199 R, 215 C; 188/56; 280/80 B

[56] References Cited

U.S. PATENT DOCUMENTS

| | | | |
|---|---|---|---|
| 1,852,209 | 4/1932 | Kirchner | 105/165 X |
| 2,039,489 | 5/1936 | Messick | 105/215 C |
| 2,043,034 | 6/1936 | Dalton | 105/215 C |
| 2,153,389 | 4/1939 | Perkins | 105/199 R |
| 2,889,785 | 6/1959 | Browne | 105/215 C |
| 2,925,791 | 2/1960 | Browne et al. | 105/215 C |
| 3,002,469 | 10/1961 | Wanner | 105/215 C |
| 3,203,711 | 8/1965 | Chew | 280/80 B X |
| 3,286,657 | 11/1966 | Browne | 105/215 C |
| 3,342,141 | 9/1967 | Browne | 105/215 C |
| 3,570,409 | 3/1971 | Delkers | 105/199 R X |
| 4,202,277 | 5/1980 | Browne et al. | 105/215 C |

Primary Examiner—Joseph F. Peters, Jr.
Assistant Examiner—Howard Beltran

[57] ABSTRACT

An air control system is provided for a vehicle convertible between highway and railway modes of travel. A main body on the vehicles includes a highway wheel-set axle unit and a rail wheel-set axle unit. The vehicle is designed so that one wheel-set axle unit is stored in an upper position while the other is in the lowered operative position. During a transfer from the highway mode of travel to the railroad mode of travel, or vice-versa, an air control system selectively allows the wheel-set axle units to be positioned in either the raised or lowered position dependent upon the mode of travel to be used. Rail suspension air springs are connected between the main body of the vehicle and the rail wheel-set axle unit and highway suspension air springs are connected between the body and the highway wheel-set axle units. A manually operated valve selectively connects a source of air pressure to either the rail suspension air springs or the highway suspension air springs while the air pressure from the other is exhausted. The rail and highway air springs perform multiple functions in addition to controlling raising and lowering operations. Various other functions found in conventional trailers and rail cars are controlled by the air control system and connected to the same source of pressure.

5 Claims, 9 Drawing Figures

FIG. 6B  MODE SELECTOR VALVE (MSV)

FIG. 6C

CONVERTIBLE RAIL HIGHWAY SEMI-TRAILER AIR CONTROLLED SUSPENSION SHIFTING SYSTEM

This application is related to copending application, Ser. No. 810,120, filed June 27, 1977, now U.S. Pat No. 4,202,277 which is directed to a convertible rail-highway semi-trailer.

Said related application covers a body which is supported by air springs on a rail wheel-set axle unit and on a highway wheel-set axle unit adjacent the rear of the body, these units being connected to the body independently of each other, and valve and conduits interconnecting a source of compressed air with the air springs to selectively inflate and deflate the air springs and thereby allow the rail wheel-set axle unit to be stored in an elevated inoperative position when the highway wheel-set axle unit is in a ground-engaging position for the highway mode and vice versa, a mechanism to lift and retain the rail wheel-set axle unit in its elevated stored inoperative position in the highway mode and another mechanism to lift and retain the highway wheel-set axle unit it its elevated stored inoperative position when in the rail mode wherein the flanged rail wheels are in the track-engaging position.

The instant invention relates to the air control system for operating said convertible rail-highway semi-trailer.

It is an object of this invention to provide an improved air control system for controlling the lowering and raising of highway and rail wheel-set axle units in a vehicle convertible between highway and railroad modes of travel.

It is a further object of this invention to provide an air control system in a vehicle convertible between highway and railroad modes of travel in which the sequence of operations during transfer from one mode of travel to the other is controlled so as to minimize the likelihood of damage to mechanical parts resulting from stresses which may build up therein if any are moved at the wrong time.

It is still a further object of this invention to provide an improved air control system which permits multiple functions of air springs including suspension, lowering and raising operations and locking control operations.

It is still a further object of this invention to provide an improved air control system for controlling raising and lowering operations as well as controlling the air functions normally found in highway and railroad systems.

In accordance with the present invention, a vehicle is convertible between highway and railway modes of travel and includes a main body having highway wheel-set axle unit and a rail wheel-set axle unit. An air control system selectively controls the movements of the wheel-set axle units between raised and lowered positions, as well as controlling other conventional functions found in a highway trailer and railway truck. Rail suspension air springs are connected between the body of the vehicle and rail wheel set axle unit and highway suspension air springs are connected between the body of the vehicle and to the highway wheel-set axle units. A source of air pressure is selectively connected to apply pressure to one or the other of the suspension air springs and exhaust the air pressure from the others. During a transfer from the rail mode to highway mode of travel, the pressure in the rail air suspension springs is exhausted and the body of the vehicle is lowered to actuate a locking mechanism to hold the rail wheel-set axle unit. Subsequently applying pressure to the highway air springs lifts the body of the vehicle thereby raising the rail wheel set axle unit with the body while holding the axle unit in its stored position. When the transfer is from the highway mode to the rail mode of travel, the pressure in the highway air springs is exhausted, the locking mechanism released and the air pressure is applied to the rail air spring to raise the body of the vehicle. The highway wheel set axle units are held in their raised stored position by coil springs. Various other functions, such as breaking pressures and the like, associated with trailers and rail cars, are compatible with the system and are controlled by the same air control system and utilize the same pressure source.

These and other objects of the invention will become more apparent as the following description proceeds in conjunction with the accompanying drawings, wherein.

Specific reference is now made to the drawings in which similar reference characters are used for corresponding elements throughout.

Figures 1, 1A:
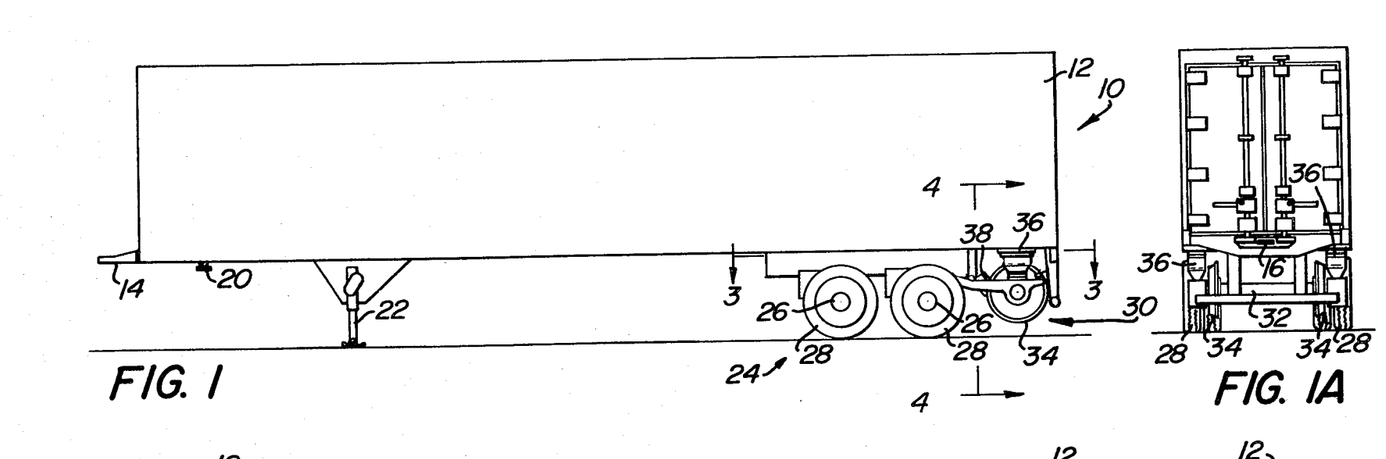
FIG. 1 is a diagrammatic side elevational view of the vehicle shown ready to be coupled to a tractor for the highway mode operation.
FIG. 1A is a rear elevational view of the vehicle in the highway mode.
Figure 2:
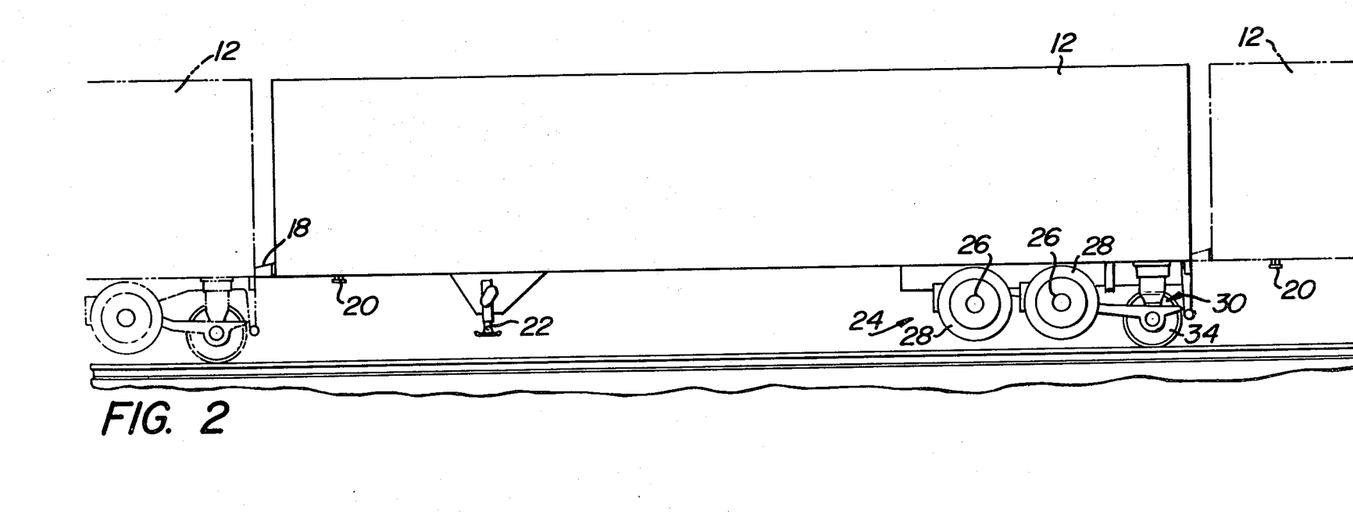
FIG. 2 is a view similar to FIG. 1 of the vehicle in the railway mode operation with the vehicles coupled end to end to form a train.

Referring first to FIGS. 1, 1A and 2, the present vehicle is generally shown at 10 and includes a body 12 of conventional semi-trailer dimensions which could be 45 ft. long, having a male coupling member 14 at its front end, and a female member 16 at its rear end to receive the male coupler of an adjacent body as at 18 to form a train for the railroad mode of operation, as seen in FIG. 2. The vehicle also includes a conventional kingpin 20 adjacent its front end for removable coupling to the fifth wheel of a tractor for the highway mode of operation, conventionally placed, telescoping semi-trailer landing gears 22, highway running gear 24 including tandem axles 26 (although a single axle suspension can be used) each axle mounting dual tired wheels 28, the running gear being suspended from the sub or underframe of the body towards the rear thereof by air-springs, the same constituting a highway wheel-set axle unit; and a railroad bogie or rail wheel-set axle unit 30, which includes a single axle 32 mounting a pair of flanged railroad wheels 34, at appropriate rail spacing transversely, the bogie being suspended by air-springs 36 from the vehicle body behind the highway running gear 24 and including a braking mechanism 38. The arrangement is such that by appropriate operation of pneumatic apparatus, the air springs suspending the highway running gear may be inflated to lower the highway wheels 28 into engagement with a paved road while the air springs 36 of the railroad bogie are deflated so that the rail wheel-set axle unit or bogie may be raised into an elevated inoperative stored position as seen in FIG. 1, and by reversing this operation, the flanged railroad wheels 34 can be lowered to engage the track while the highway wheel-set axle unit is raised into an elevated inoperative stored position as shown in FIG. 2. In this latter railroad mode, the vehicle may be coupled as at 18 end to end to form a train to be pulled by a suitable locomotive. It will be understood that in the highway mode, when the highway wheels 28 engage the road and the flanged railroad wheels 34 are in the raised stored position, the landing gear 22 is in the load supporting position during which time a conventional tractor is coupled to the kingpin 20, the landing gear is telescoped to a raised position and the vehicle will then be driven as an over-the-road tractor-semi-trailer combination.

Figure 3:
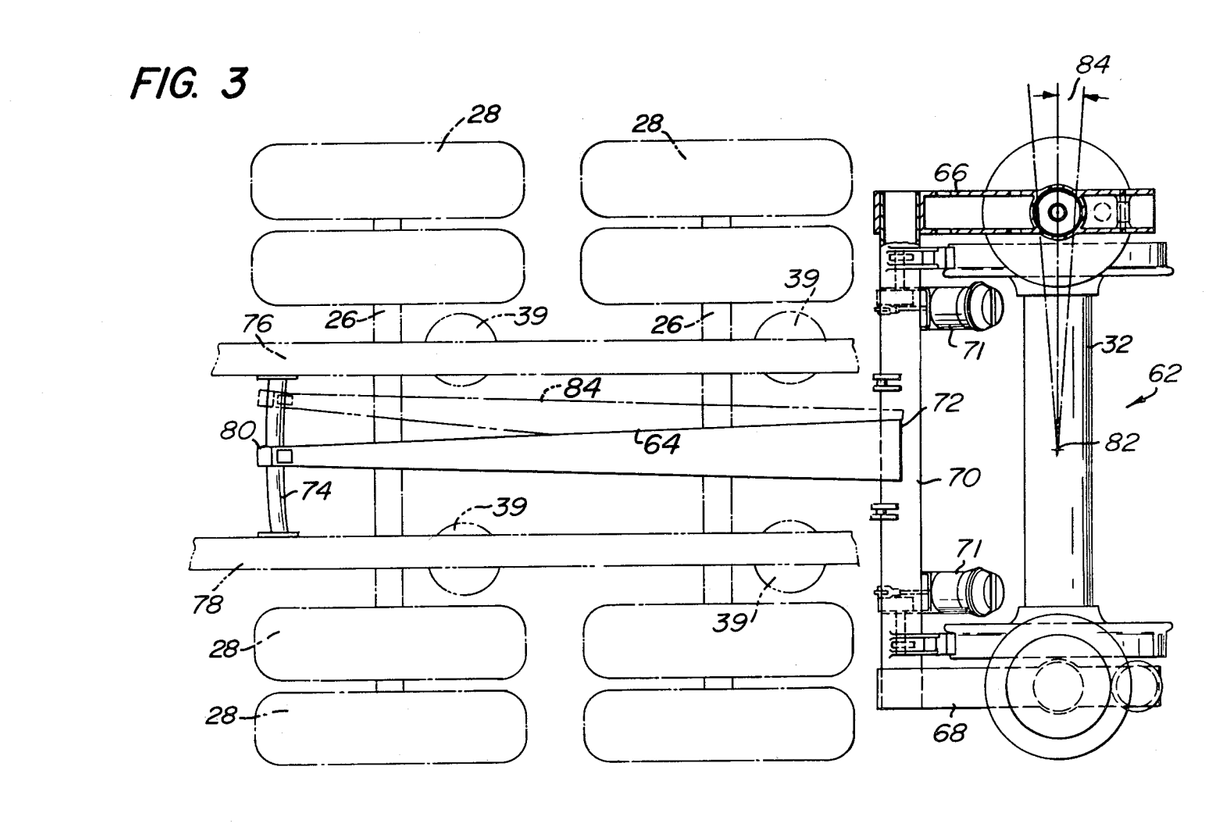
FIG. 3 is a plan view partially in section taken on the line 3—3 of FIG. 1 and showing the rail bogie with the highway axle and wheel assemblies shown in phantom.

In FIG. 3, the air bags 39 on channel members 76 and 78 supporting the body on the highway wheel-set axle unit are shown diagrammatically and are fully described in related copending application Ser. No. 810,210, now U.S. Pat. No. 4,202,277. Short references are made to this figure.

The bogie 30 which is shown in detail in FIG. 3 comprises a yoke 62 and a longitudinally extending tubular tongue 64 which is angulated so that its forwardly extending portion overlies and clears the highway wheel axles 26. The yoke comprises transversely spaced longitudinal forwardly extending side members 66 and 68, preferably of hollow rectangular configuration which are connected at their forward ends by a transversely extending tubular member 70. The tongue 64 is welded to the transverse tubular member of the yoke as at 72 centrally thereof. The member 70 mounts a suitable brake 71 for each railroad wheel.

At the location of the forward end of the tongue 64, which is about 10 ft. long, an arcuate tube 74 is secured to the running gear channels 76 and 78 of the vehicle extending transversely therebetween. The forward end of the tongue is provided with a split collar 80, retained by bolts. Thus, the bogie is allowed to self steer as the front end of the tongue is allowed to slide from side to side on the arcuate tube 74 so that the rail axle 32 is free to rotate about a vertical axis 82 at its center. The steering angle is limited by the length of the arcuate member 74 and is shown in phantom in FIG. 3 as 84. When the railroad brakes are applied, the arcuate tube 80 supplies the longitudinal restraint, and also the vertical restraint to the forces produced by the brake torque. It will be understood that the arcuate tube 74 may be of any suitable cross-section.

Figure 4:
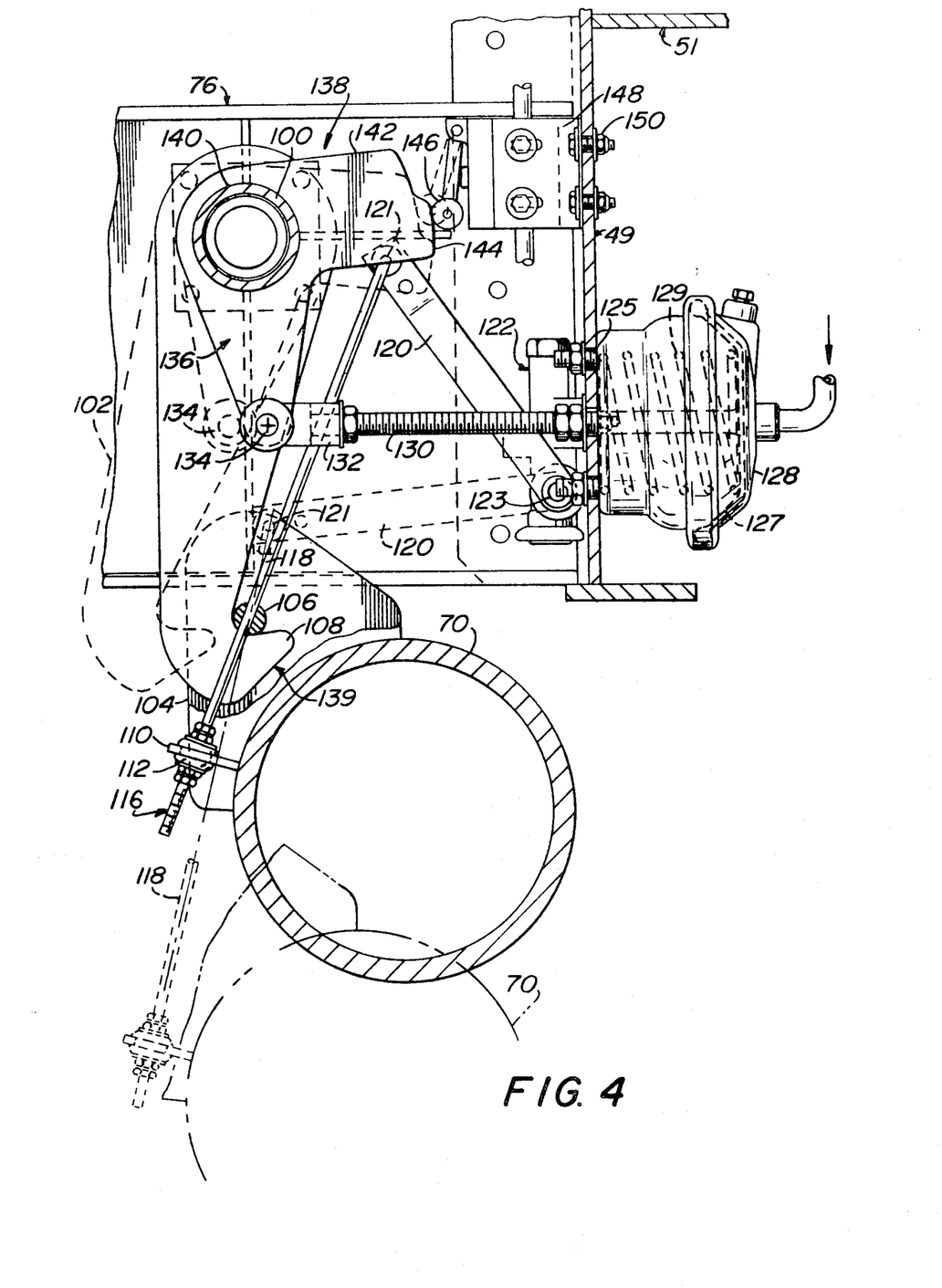
FIG. 4 is a sectional view taken along the line 4—4 of FIG. 1 illustrating the rail bogie lifting and retaining mechanism.

Reference is now made to FIG. 4 where the lifting and retaining mechanism which is the subject of copending application Ser. No. 125,507, filed Feb. 28, 1980, is shown in detail. Rotatably mounted on the longitudinal running gear channels 76 and 78 on the underside of the vehicle body and above the cross tube 70 of the bogie yoke member 62 (FIG. 3) is a transverse tube 100. Welded to the tube 100 and rotatable therewith are a pair of transversely spaced downwardly extending hook members 102 with rearwardly extending hook ends 108. Welded to the cross tube 70 are transversely spaced pairs of lugs 104 which mount transversely extending shoulder bolts 106 between them engageable by the hook end 108 of each hook member 102.

Connected to the tube 70 at a projecting lug 110 by means of grommets 112 and lock nuts and washers is the threaded end 116 of an operating rod 118 whose other end is pivotally connected as at 121 to one end of a lever arm 120 which is pivotally connected to an adjustable position, 3-way, lever-operated height control valve 122 at shaft 123 and selectively opens and closes the valve.

Mounted as at 125 to the vertical web 49 of the rear sill structure of the vehicle underframe is a mechanico-pneumatic brake chamber 128. The chamber includes a diaphragm 127 and a spring 129 which is operatively connected to a threaded piston rod 130 upon which is secured a yoke 132 which mounts a pin 134 which is in turn secured to the arm 136 of a bell crank 138 which is fixed at its corner as at 140 to the rotatable tube 100, the other arm 142 of which also has a cam surface 144 which actuates a roller 146 which is operatively connected to a roller-lever-operated 2-position, 3-way valve 148 and which is also mounted as at 150 on the vertical web member 49. The action of the brake chamber 128 is such that when air is admitted into it behind the diaphragm 127, the spring 129 will be compressed and the push rod 130 will be extended whereas when air is removed from the chamber, the previously compressed spring will expand and retract the rod 130.

In operation, to convert the vehicle from the rail mode to the highway mode, a 3-position, 6-way, lever operated mode selector valve MSV (see FIG. 6) is moved first to a transfer position which actuates 2-position, 2-way pilot-operated quick release valves (see FIG. 6) whereby air is vented from the rail air bags whereupon the vehicle body settles. This shortens the distance between the body and the bogie, i.e., between the tube 100 and cross tube 70, moving the operating rod from the phantom to the solid line position of FIG. 4 thereby opening height sensing valve 122, though in the rail to highway conversion this has no function.

As the body approaches its lowest position, the hooks 102 are in their solid line position, being held there by the spring 129 in brake chamber 127 which is pulling the rod 130 urging the entire assembly consisting of bell crank 138, tube 100, and hooks 102 in a counter-clockwise direction. As the bottom surface 139 of hooks 102 comes into contact with shoulder bolts 106, the hooks are cammed into a clockwise rotation until they can slide into an engaging position under bolts 106, rotating counter-clockwise under the urging of spring 129.

Now, when the highway air bags 39 (FIG. 3) are inflated by moving the mode selector valve MSV to the highway position, the hooks retain the rail wheel-set axle unit in its elevated stored position. In this position the cam 144 acting on the roller 146 keeps valve 148 open and control rod 118 keeps control valve 122 open. These two valves are a safety device to prevent inflation of the rail air bags while the hooks are engaged under the shoulder bolts. As long as valve 148 has its operating lever in the solid line position, it is open (allowing air to flow through), and as long as valve 122 has its operating arm 120 in the solid line position, it is also open. Air to inflate the rail air bags must flow through the "rail" supply line through a 2-position, 2-way, pilot-operated feed valve to adjustable position, 3-way, lever-operated levelling valves and thence to the air bags. However, as long as air pressure is present at the control port of the feed valve, it remains closed, not permitting air to flow to the air bags. Since valves 122 and 148 are both open as long as hooks 102 are engaged, no air can flow to the air bags.

In the reverse conversion from the highway mode to the rail mode, the mode selector valve is moved from "highway" to "transfer", causing deflating of the highway air bags allowing the body to settle until the railroad wheels are on the tracks.

The mode selector valve MSV is now moved to "rail" position directing air through the "rail" supply line to both the feed valve where it is momentarily blocked and to valve 122 from which it is delivered through valve 148 to the control port of the feed valve and at the same time to brake chamber 127 which now pushes hooks 102 out of engagement with shoulder bolts 106 and simultaneously rotates cam surface 144 clockwise allowing valve 148 to close. This now permits air to flow through the feed valve and levelling valves to the air bags, causing the body to rise. Since cross-tube 70 remains down while the body rises, control rod 118 and valve operating arm 120 go to the dotted line position, at which time valve 122 closes off its supply port and vents the chamber 127 to atmosphere allowing spring 129 to return bell crank 138 and hooks 102 to the solid line position, ready for the next cycle.

Figures 5, 6A:
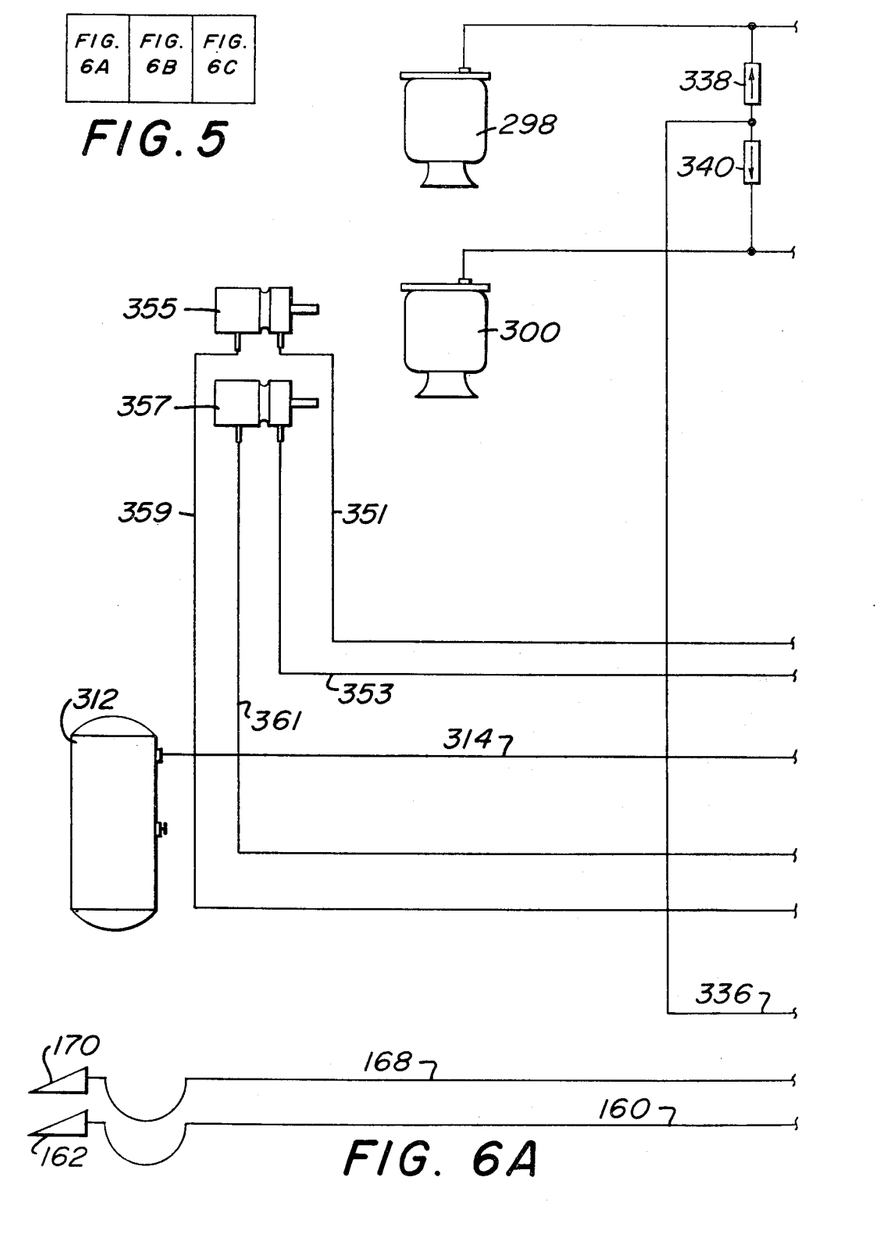
FIG. 5 is a diagram illustrating the arrangement of FIGS. 6a, 6b and 6c in order to provide the composite view.
FIGS. 6a, 6b, and 6c are composite diagrammatic views of the pneumatic control system arranged as illustrated in FIG. 5, in accordance with the present invention.
Figure 6B:
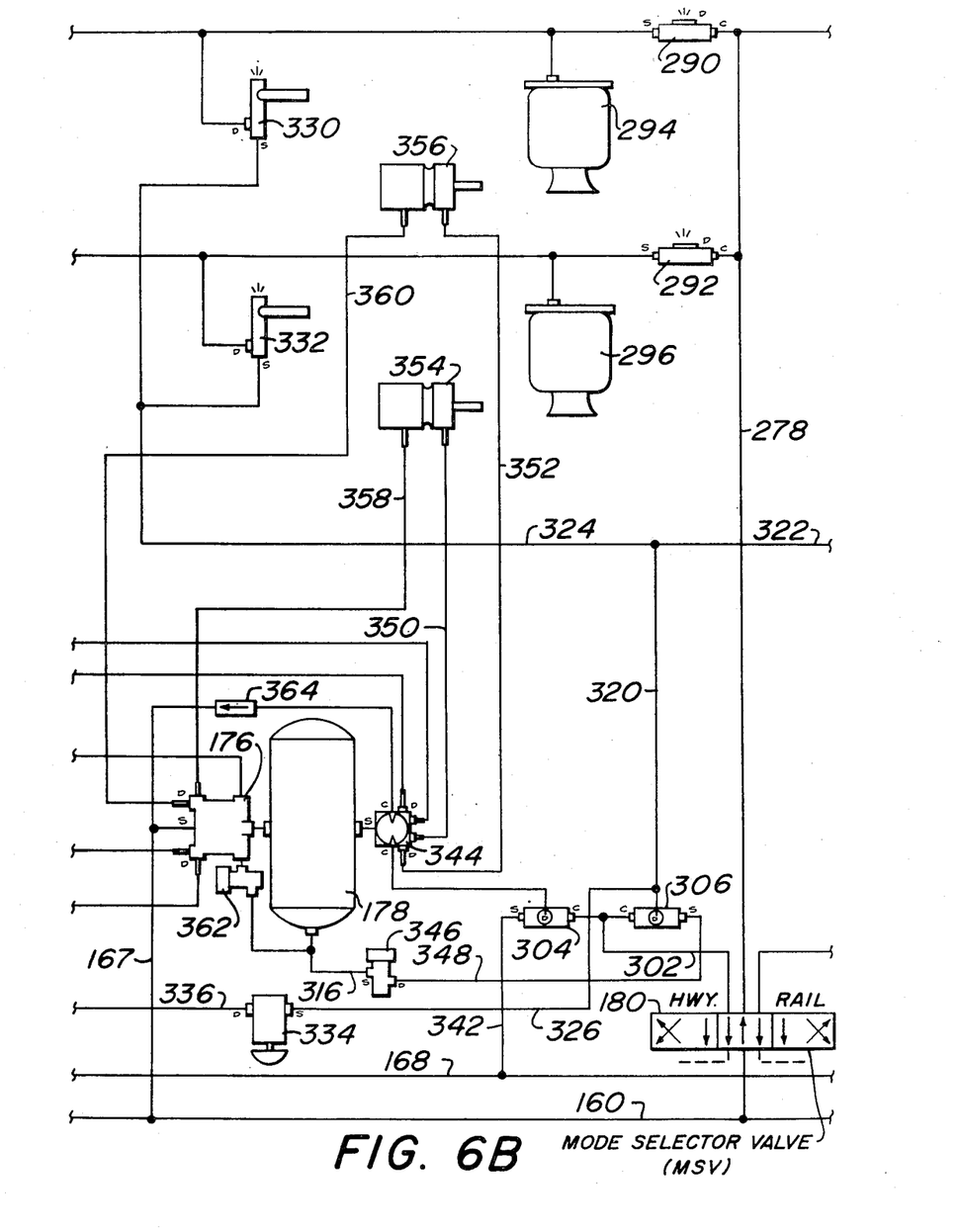
Figure 6C:
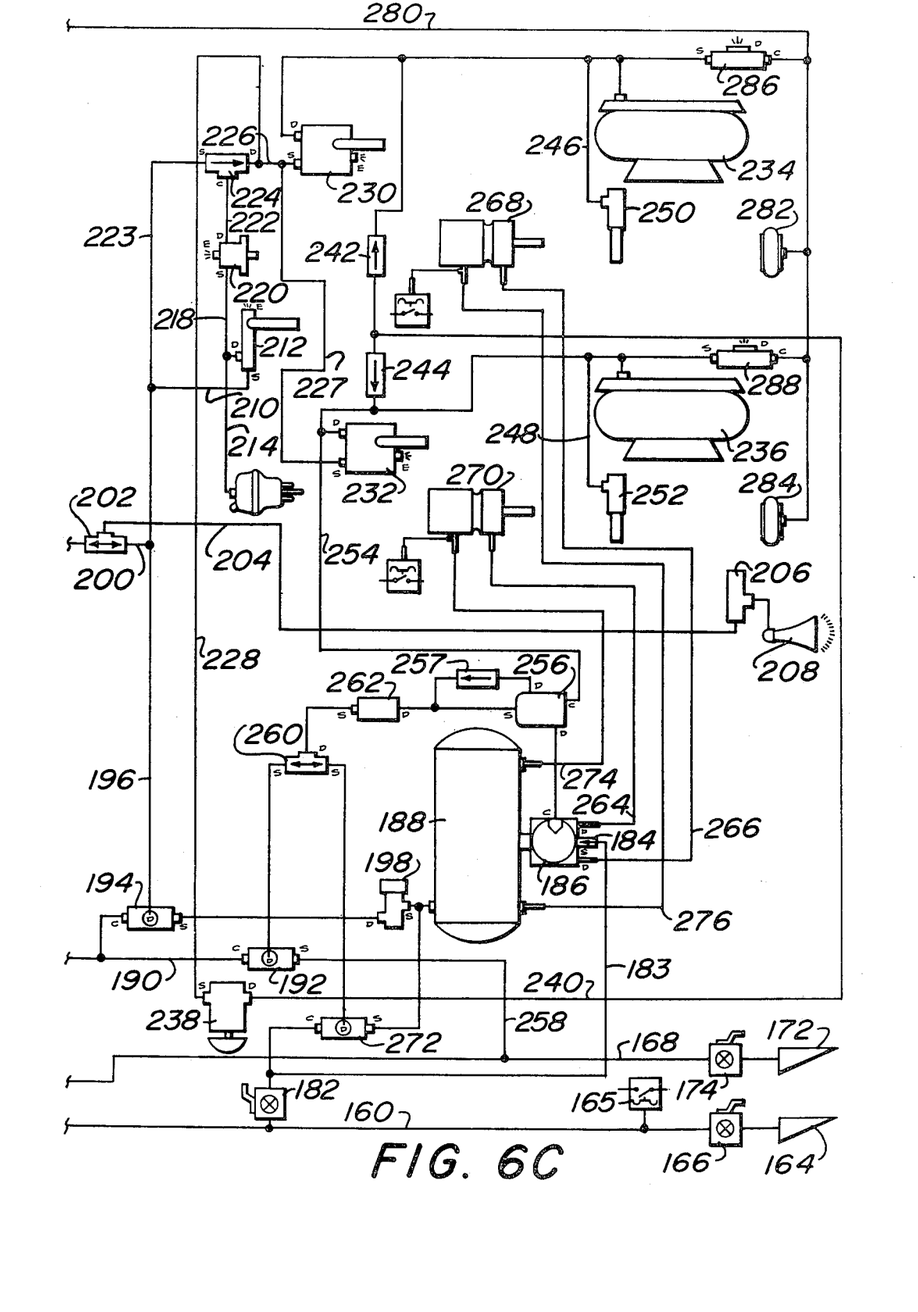

Referring to FIGS 6a, 6b and 6c, an air circuit schematic for use in a rail-highway semi-trailer system, as illustrated in FIGS. 1 and 2, includes a supply line 160 which is kept continually charged to approximately 110 p.s.i., for example, whenever the vehicle is connected to a towing vehicle, either a truck-tractor or a locomotive. The line 160 is connected to the source of pressure, which may be compressed air, by a connector or glad hand 162. The opposite end of the line may be connected to a trailing vehicle by glad hand 164. If there is no trailing vehicle, the supply line 160 is closed off by a shut-off valve 166. A supply line pressure switch 165 may be provided.

A signal or service brake line 168 is connected to a towing vehicle or locomotive by a glad hand 170. The opposite end of the line 168 may be connected to a trailing vehicle by a glad hand 172. In the absence of a trailing vehicle, the brake service line 168 is closed off by a shut off valve 174. The signal line 168 is normally open to atmosphere unless the service brakes are applied by the operator of the towing vehicle or locomotive. When the service brakes are applied by an operator, the brake valve in the towing vehicle or locomotive (not illustrated) closes the exhaust port in the brake valve and pressurizes the signal line 168.

The compressed air, entering the line 160 through the glad hand 162, is piped through line 167, to a trailer valve 176 through which a highway service reservoir 178 is charged. The line 160 is also connected to mode selector valve(MSV) 180. Also, the line 160 is connected through a valve 182 and line 183 and rail feed check valve 184 to rail brake relay valve 186 to charge rail reservoir 188. Except for the charging of the reservoirs 178 and 188, all supply air from line 160 enters the rest of the system through MSV 180.

The MSV 180 is a manually operated three position valve. This permits the system to be switched between the rail mode of operation, the highway mode of operation, and a transfer mode during which a transfer is made from one mode to the other, i.e., from the rail mode to the highway mode or vice-versa. The last named position involving transfer is illustrated in the drawing. This is the center position on the MSV 180.

In the rail mode of operation, the right hand side of the MSV 180 is aligned with the connection to pipe or line 190. Supply air enters from the line 160 through line 190 and is piped to control ports of rail service brake control valve 192 and rail mode auxiliaries control valve 194. All auxiliary air operated devices are fed by line from valve 194 and from the rail pressure protection valve 198 which is supplied from the rail reservoir 188. When the rising pressure level of air in the reservoir 188 reaches 70 p.s.i., for example, pressure protection valve 198 opens and allows air to flow to the auxiliary devices. The valve 198 is designed to insure a supply of air to the brakes by protecting the air in the reservoir 188 in the event of any failure in the system which would interrupt or deplete the air supply.

When the rail pressure protection valve 198 opens, air flows through valve 194 to line 196. Air flows from the line 196 to line 200 and through a horn supply shuttle valve 202. From the valve 202, air passes through line 204 to a coupling pin sensing valve 206 which senses the position of the coupling pin within member 18 (FIG. 1). If the coupling pin is in a locked position, engaged with member 14, or in its locked position in the absence of another vehicle to the rear, the valve 206 will be closed. If the coupler pin is not locked, the valve 206 is open and a "coupler open" alarm horn sounds. A coupling arrangement is described in detail in a copending patent application entitled "Automatic Coupler to Connect Rail-Highway Vehicles End to End," Ser. No. 125,506, filed Feb. 28, 1980.

Air also flows through lines 196 and 210 to a bogie position sensing valve 212 associated with the cross tube 70 (FIG. 4). The valve 212 should be open after any transfer operation to allow air to flow through line 214 to a lifting hook cylinder 216. Air also passes through line 218 to hook position sensing valve 220. The lifting hook 102 is illustrated in FIG. 4. The valve 220 is open as long as the cross tube 70 lifting hooks 102 are in the engaged position. Air passes from the valve 220 and flows through line 222 to the control port of a rail airbag interlocking cut-off valve 224 which remains closed as long as valve 220 is open.

As mentioned, FIG. 4 illustrates many of the elements controlled by the air control circuit of the present invention. Further details relating to FIG. 4 are included in copending application Ser. No. 125,507, filed Feb. 28, 1980.

When the lifting hook cylinder 216 is pressurized, it disengages cross tube lifting hooks, such as the hook 102 (FIG. 4), closing the hook position sensing valve 220 which allows air from line 223 to flow through the rail interlock cutoff valve 224 to lines 226 and 227. Lines 226 and 227 supply air to the rail levelling valves 230 and 232, respectively. When the position of the vehicle body 12 (FIG. 1) is lower than correct operating height, air is admitted to rail suspension air springs 234 and 236. When the air springs 234 and 236 are properly inflated, the levelling valves 230 and 232 close off the air supply thereto.

Line 228 supplies air to a rail quick fill valve 238. Air from the valve 238 may flow through a line 240 to supply air directly to the air springs 234 and 236 through quick fill check valves 242 and 244, respectively, bypassing the levelling valves 230 and 232. The valves 242 and 244 are used to speed up the inflation of the air springs 234 and 236 during initial filling or when it is desirable to raise the body of the vehicle above its normal operating height.

Lines 246 and 248 transmit air spring pressure to rail bogie vertical dampers 250 and 252 to adjust their damping valves proportionally to the load being carried on the air springs 234 and 236.

Line 254 transmits air spring pressure to the control port of a load-brake ratio valve 256 which is a load proportioning valve to allow braking force to be proportioned to the load on the rail axle. A check valve 257 is connected to the output of the valve 256 as indicated.

Consider now the braking operation when the bogie is in operating position. When it is desired to apply the rail brakes, the engineer in the locomotive applies the brakes to pressurize the signal line 168. Air flows through line 258 to the rail service brake control valve 192. The valve 192 is open as long as supply line pressure at line 160 is maintained on its control port. This signal line pressure is transmitted through a brake mode shuttle valve 260 and a pressure limiting valve 262 which, in turn, is connected to the control port of the rail brake relay valve 186 through the load-brake ratio valve 256. Reservoir air pressure is modulated by valve 186 in proportion to the pressure on its control port. Relay valve 186 then allows the modulated air pressure to flow from reservoir 188 through lines 264 and 266 to the service brake chambers of brake cylinders 270 and 268.

When the brake signal line 168 is vented by the engineer, control air pressure is removed from the relay valve 186. Air flow from the reservoir 188 is then shut off and the lines 264 and 266 are vented through the exhaust port of valve 186 releasing the brakes.

In the event of a train break-in-two, or if the supply line 160 is vented for any other reason, control pressure is removed from the rail emergency brake control valve 272. Valve 272 opens allowing compressed air to flow from reservoir 188 through valve 272, shuttle valve 260 and pressure limiting valve 262. Pressure from the valve 262 is applied to load ratio valve 256 and relay valve 186 to apply service brakes as previously described.

Lines 274 and 276 transmit pressure from the reservoir 188 to the spring brake chambers of brake cylinders 270 and 268, preventing application of the spring brakes. In the event of any type of failure which depletes the pressure in the reservoir 188 below 60 p.s.i., for example, the spring brakes begin to apply, reaching full application when the pressure drops to approximately 10 p.s.i. The spring brakes act as parking brakes after pressure from the reservoir 188 has leaked off and prevent the train from being moved until the reservoirs in all the cars have been charged to operating pressures.

Consider now the operation of the system when it is desired to convert from rail travel to highway travel. In this case, the vehicle 10 (FIG. 1) has been uncoupled from a train and is resting on a tractor fifth wheel, with the signal and supply lines connected to the tractor air lines, but with its rail wheels still on the track and its highway wheels in the raised position. FIG. 2 illustrates the highway wheels 28 in raised conditions with the rail wheels 34 in lowered conditions.

The MSV 180 is shifted to the transfer or center position as illustrated. In this position, air flows from the tractor compressor and reservoir to the supply line 160 and through the MSV 180 to lines 278 and 280. Air pressure from the line 280 inflates bumper pin release cylinders 282 and 284 which retract bumper pins (not shown) allowing the rail suspension strut to telescope. Simultaneously, air from the line 280 flows to the control ports of rail airbag quick release valves 286 and 288 to vent the rail air springs 234 and 236, respectively. This allows the vehicle body 12 (FIG. 1) to lower until the cross tube 70 lifting hooks 102 engage the lifting lugs 104 on the cross tube (FIG. 4). At the same time, air pressure in the line 278 will open highway airbag quick release valves 290 and 292 to vent the highway air bags 294, 296, 298 and 300. This operation in this case is meaningless because the highway air bags are already empty.

To achieve highway operation, the MSV 180 is now shifted to the highway position, which is the left hand position illustrated. In this position, air pressure now is piped from the line 160, through MSV 180, through a line 302 and pressurizes the control ports on a highway service brake control valve 304 and a highway mode auxiliaries control valve 306 thereby causing them to open.

As previously mentioned, the trailer valve 176 receives pressure from the line 167 which is connected to supply line 160. The reservoir 178 is pressured by air from the valve 176. This in turn pressurizes a reservoir 312 through line 314. As was the case in connection with the rail mode, when the reservoir 178 has been pressurized to 70 p.s.i., for example, air flows through a line 316, to a highway pressure protection valve 346. The valve 346 opens to allow pressure to flow through the highway mode auxiliaries control valve 306, line 320 to lines 322 and 324, as well as through line 326.

Air pressure from line 322 flows through horn supply shuttle valve 202 and through line 204 to the coupler alarm horn 208. While this situation is not a safety problem, it is desirable for the coupler to be in the locked position when travelling in the highway mode.

Air flowing through line 324 is piped to highway levelling valves 330 and 332. Air from these valves pass to the highway air springs 294, 296, 298 and 300 to inflate them and raise the body 12 to its operating height. The cross tube lifting hooks 102 (FIG. 4) which are attached to the body 12 raise the rail axle and wheel set of the bogie in their stored position.

To speed up the inflation of the highway air springs 294, 296, 298 and 300, a highway quick fill valve 334 is opened manually, allowing compressed air from the line 326 to flow through line 336 and through quick fill check valves 338 and 340 directly to the highway air springs 294, 296, 298 and 300 thereby bypassing the levelling valves 330 and 332.

When it is desired to apply the highway brakes, the tractor driver applies his brake as on any tractor semi-trailer operation, pressurizing signal line 168 and through open valve 304 operates the trailer brakes. The balance of the trailer braking system is completely standard and is referred to only briefly.

When the operator applies the brakes to pressurize the signal line 168, air flows from the line 342, through the highway service brake control valve 304 to the highway service brake relay valve 344.

Modulated air pressure from the reservoir 178 is applied through lines 350, 351, 352 and 353 to the service brake chambers of the brake cylinders 354, 355, 356 and 357. When the control air pressure is removed from the valve 344, air flow from the reservoir 178 is shut off and the lines 350, 351, 352 and 353 are vented through the exhaust ports of the valves 344 and 176.

Lines 358, 359, 360 and 361 transmit pressure from the reservoir 178 to the brake cylinders 354, 355, 356 and 357, respectively to prevent application of the spring brakes. When the pressure in the reservoir 178 drops below a predetermined pressure, the spring brakes are applied. The spring brakes also may act as parking brakes. A pressure protection valve 362 is connected between valve 176 and line 316 which is also connected to the reservoir 178. A check valve 364 is connected between the valve 344 and line 310 which is also connected to the valve 176.

When it is desired to convert back to rail operation, the trailer is positioned by the tractor with the rail wheels over the rails and with its front end still on the tractor fifth wheel, and the air lines still connected. The mode selector valve is again placed in the transfer position, so that line 278 is pressurized, applying control pressure to quick release valves 290 and 292 which opens them, exhausting the air from highway air springs. Air flow at this time through line 280 is meaningless. When the vehicle body has settled due to the deflation of the highway air springs, the MSV 180 can be moved to the rail position, initiating the operations again as previously described. The symbols in the drawings D, S and C mean delivery, supply and control, respectively.

While it does not enter into the air circuitry illustrated, the highway axle and wheel sets are raised into their stored position and retained there by mechanical springs. Their forces are overcome by the highway air springs 294, 296, 298 and 300 when inflated. One such mechanical arrangement for storing the highway axle and wheel sets is illustrated in the parent case to which reference has been made.

What is claimed is:

1. In a vehicle convertible from highway to railroad mode of travel and vice versa including a body; a rail wheel-set axle unit, air spring means supporting said body on said rail wheel-set axle unit adjacent the rear of the vehicle, a highway wheel-set axle unit, air spring means supporting said body on said highway wheel-set axle unit independently of, adjacent and in front of said rail wheel-set axle unit and means interconnecting said body and said rail wheel-set axle unit operative to lift and retain said rail wheel-set axle unit to its elevated stored inoperative position in the highway mode, and means interconnecting said body and said highway wheel-set axle unit independently of said body and rail wheel-set axle unit interconnecting means and operative to lift and retain said highway wheel-set axle unit to its elevated stored inoperative position in the rail mode wherein the rail wheels are in a track engaging position, an air control system operatively interconnecting a source of compressed air with said air spring means of said rail wheel-set axle unit and of said highway wheel-set axle unit to selectively inflate and deflate said rail wheel-set axle unit air spring means and the highway wheel-set axle air spring means and thereby raise said rail wheel-set axle unit into an elevated inoperative position and lower said highway wheel-set axle unit into a ground-engaging position for the highway mode of travel and vice versa, said air control system comprising:

a. a three way mode selector valve connected to said source of compressed air for directing the application of pressure from said source of compressed air to said rail wheel-set axle unit air spring means when it is in a first position during a rail mode of travel, for directing the application of pressure from said source of compressed air to said highway wheel-set axle air spring means when it is in a second position during a highway mode of travel, and for preventing the application of pressure from said source of compressed air to both rail wheel-set axle unit and highway wheel-set axle unit air spring means when it is in a third position during a transfer from one mode of travel to the other, and b. levelling valves to control air from said source of compressed air to said rail and highway wheel-set axle unit air spring means to maintain them at predetermined heights.

2. An air control system as set forth in claim 1 wherein quick fill valves are connected to bypass said levelling valves to connect air from said source of compressed air to said rail and highway wheel-set axle unit air spring means during its initial filling period and when desired to inflate said air spring means beyond said predetermined heights.

3. An air control system as set forth in claim 1 wherein air is connected from said rail wheel-set axle air spring means to vertical rail wheel-set dampers to adjust their damping valves proportionally to the load being carried on said rail wheel-set axle unit air spring means when said mode selector valve is in said first position.

4. An air control system as set forth in claim 1 wherein air from said source of compressed air is connected to rail and highway quick release valves to release the air pressure in said rail wheel-set axle air spring means and said highway wheel-set axle air spring means respectively, when said mode selector valve is in said third position.

5. An air control system as set forth in claim 1 including rail brake cylinders, a first reservoir for supplying pressure to said rail brake cylinders, means connecting said source of compressed air to said first reservoir, control valve means connected between said first reservoir and said rail brake cylinders, highway brake cylinders, a second reservoir for supplying pressure to said highway brake cylinders, means connecting said source of compressed air to said second reservoir and control valve means connected between said second reservoir and said highway brake cylinders.

* * * * *